United States Patent
Surla et al.

(10) Patent No.: US 7,974,953 B1
(45) Date of Patent: Jul. 5, 2011

(54) SYSTEM AND METHOD FOR DELETION OF WRITEABLE PPIS

(75) Inventors: Rushi S. Surla, Bangalore (IN); Gaurab Paul, Bangalore (IN); Vasantha Prabhu, Bangalore (IN); Ritesh Tiwari, Bangalore (IN)

(73) Assignee: NetApp, Inc., Sunnyvale, CA (US)

(*) Notice: Subject to any disclaimer, the term of this patent is extended or adjusted under 35 U.S.C. 154(b) by 487 days.

(21) Appl. No.: 12/259,862

(22) Filed: Oct. 28, 2008

(51) Int. Cl.
 *G06F 17/30* (2006.01)
(52) U.S. Cl. .................. 707/663; 707/666; 707/689
(58) Field of Classification Search .................. 707/663
 See application file for complete search history.

(56) References Cited

U.S. PATENT DOCUMENTS

| 7,590,660 B1* | 9/2009 | Richards et al. ............ 1/1 |
| 7,725,436 B1* | 5/2010 | Park .................... 707/639 |
| 7,912,815 B1* | 3/2011 | Smoot et al. ............. 707/659 |
| 2004/0117506 A1* | 6/2004 | Ito .................... 709/245 |
| 2004/0255080 A1* | 12/2004 | Kihara et al. ........... 711/114 |
| 2005/0004979 A1* | 1/2005 | Berkowitz et al. ......... 709/203 |
| 2005/0097260 A1* | 5/2005 | McGovern et al. ......... 711/100 |
| 2007/0016740 A1* | 1/2007 | Somavarapu ............. 711/162 |
| 2010/0007731 A1* | 1/2010 | Joseph et al. ............ 348/143 |

OTHER PUBLICATIONS

NetApp, Introduction to Data Ontap 7G, Network Appliance Inc., Oct. 2005, TR3356.*
Alex osuma, An Introduction to FlexClone Volume, IBM, 2006.*

* cited by examiner

*Primary Examiner* — Don Wong
*Assistant Examiner* — Binh V Ho
(74) *Attorney, Agent, or Firm* — Perkins Coie LLP

(57) ABSTRACT

Techniques introduced herein allow writeable PPIs to be analyzed prior to deletion to determine whether or not the writeable PPIs have reached the end of their life cycle. Prior to deletion a writeable PPI manager can inspect the writeable PPI to determine whether or not the writeable PPI has reached the end of the writeable PPI life cycle. If various criteria are not met, then the writeable PPI can be determined to have not yet reached the end of its life cycle and the deletion can be prevented.

12 Claims, 7 Drawing Sheets

SYSTEM AND METHOD FOR DELETION OF WRITEABLE PPIS

BACKGROUND

Computing systems store vast amounts of data. The data can be stored on mass storage devices, for example, magnetic or optical disks. The mass storage devices can be managed by a storage system including a computing device such as a network storage controller. The network storage controller can allow file level access, block level access, or both, to data stored within the mass storage devices. Such mass storage devices may be organized into groups of drives, such as into a redundant array of independent disks (RAID). The non-volatile mass storage devices may be aggregated and divided into volumes including logical units. Each logical unit within a volume can be identified by a logical unit number (LUN). Data is stored to and retrieved from the logical units by the hosts as though the logical units were locally attached to the hosts as mass storage devices.

A volume and all included logical units can be backed up by creating a persistent point-in-time image (PPI) of the volume. A PPI is typically creates as read-only, however a PPI can be created as both readable and writeable. Such a read-write PPI can be used as a "writeable PPI." Typically, a writeable PPI is created by a user or entity having permission to create, modify, and delete the writeable PPI. One or more hosts (e.g., clients) may access the writeable PPI via a network, such as by mapping to the logical units within the writeable PPI and reading from and writing to the logical units as virtual mass storage devices.

A "writeable PPI" can be used for a variety of purposes, for example, to test and/or change data without interrupting clients using the data on the volume from which the writeable PPI is created. In order to access the writeable PPI for reading and writing data, a client creates a file system. A "file system" is an executable process, such as software for execution on a computing device. The file system is used to manage conventional "files," and/or blocks of data.

When the client has completed its purpose, e.g., testing data, the client can delete the file system. The deletion of the writeable PPI from the storage system typically follows deletion of the file system. The deletion has many purposes, for example, to avoid unnecessary use of storage space, which is often a limited resource. However, at times one or more conditions exist indicating that the writeable PPI has not reached the end of its life cycle.

Several conditions are described by way of example: clients or entities other than the client creating the writeable PPI may have begun using the writeable PPI. Alternatively, new logical units could have been created in the writeable PPI, indicating that the writeable PPI is still in use. Further, new PPIs derived from the writeable PPI may have been created. Also, clients could be directly mapped to the logical units themselves. Another example of a condition presents itself when a client other than the client that created the writeable PPI requests deletion of the writeable PPI. The request could indicate malicious or accidental deletion to the detriment of the creator of the writeable PPI.

In an environment having numerous volumes, deletion of writeable PPIs can impact performance for many clients or entities. Under any of these conditions described above, and under other conditions not described, deletion could result in undesirable data loss, and could interrupt the clients or other entities. Therefore, the deletion of the writeable PPI should not be done if the writeable PPI has not reached the end of its life cycle.

DETAILED DESCRIPTION

As described above, clients can create a writeable PPI, use the writeable PPI, and ultimately delete the writeable PPI. These steps are the life cycle of the writeable PPI. However, as discussed above, various conditions can present themselves that indicate that the writeable PPI should not be deleted, such as where the writeable PPI is still in use by some entity at the time of deletion.

Techniques introduced herein allow writeable PPIs to be inspected prior to deletion to determine whether or not the writeable PPI has reached the end of its life cycle. An entity called a "writeable PPI manager" can perform the inspection. Exemplary areas for testing of the writeable PPI include testing for current use, deletion by an entity other than the owner, creation of new logical units and creation of writeable PPIs derived from the writeable PPI. Other areas and aspects of the writeable PPI can be inspected and/or tested as well.

In preparation to inspect the writeable PPI for the conditions described above, the writeable PPI manager can store information within the writeable PPI at the time of creation of the writeable PPI. This information can be stored as metadata in a metadata file within the writeable PPI. Exemplary metadata can include an identifier of the creator of the writeable PPI. A creation time can be obtained as well. For example, the storage system can be queried for the creation time of the metadata file. The file creation time can be used as a time of creation of the writeable PPI as creation of the file can immediately follow the creation of the writeable PPI. Other metadata can be stored as well.

In accordance with these techniques, the writeable PPI manager can inspect the writeable PPI for the conditions described above. Where needed, the inspection can make use of metadata retrieved from the writeable PPI. Ultimately the writeable PPI manager can decide whether or not the writeable PPI should be deleted or not.

Figure 1:
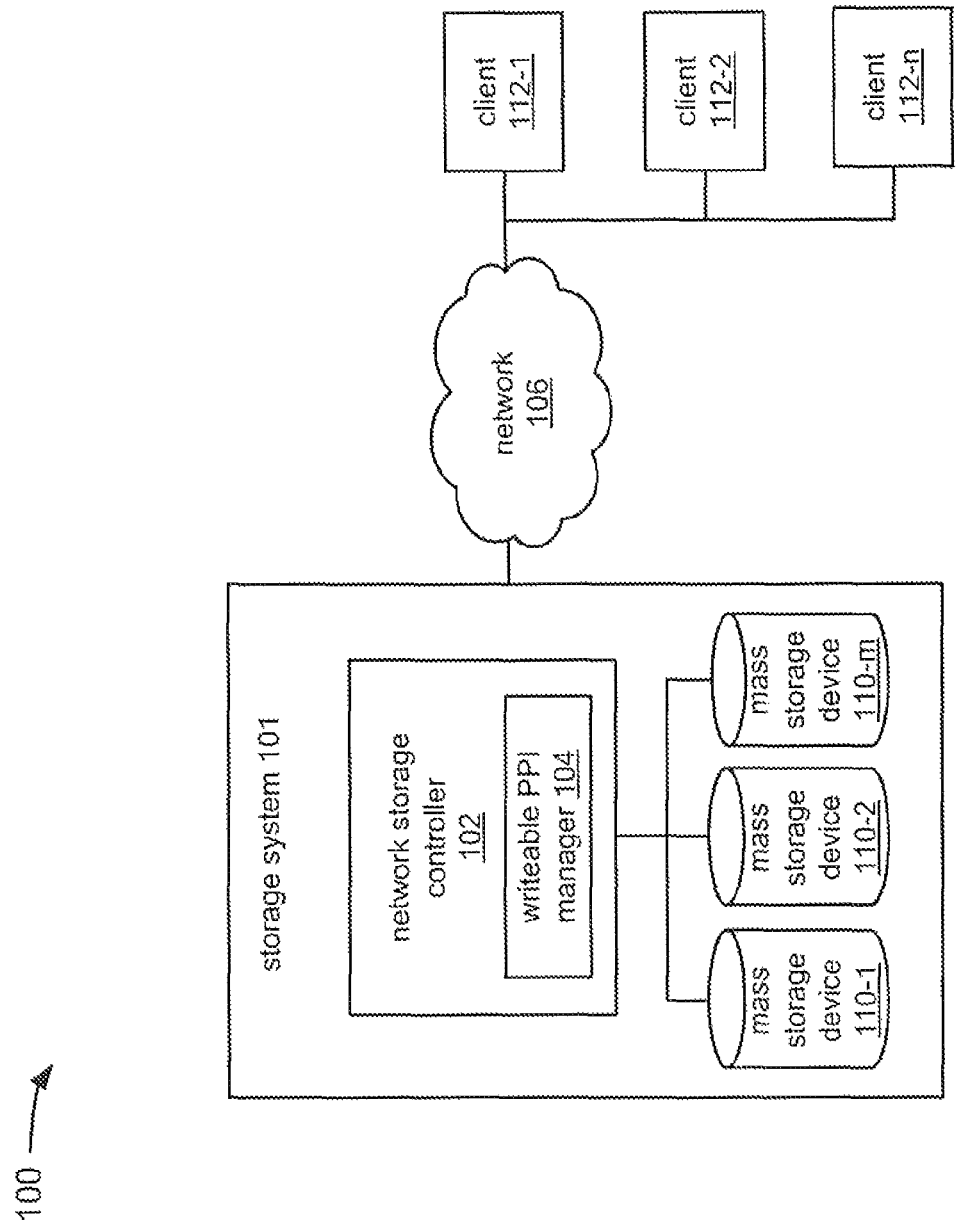
FIG. 1 is a diagram of an example of a system using a writeable PPI manager to create manage and delete writeable PPIs.

FIG. 1 is a diagram of an example of a system 100 using a writeable PPI manager to create manage and delete writeable PPIs. System 100 includes storage system 101, network 106 and clients 112-1 through 112-n. Storage system 101 includes network storage controller 102 and mass storage devices 110-1 through 110-m. Network storage controller 102 includes writeable PPI manager 104.

In the example of FIG. 1, storage system 101 implements functions associated with storage and retrieval of data on behalf of one or more of the clients 112 and can implement one or more network storage protocols, such as iSCSI (internet/initiator SCSI (small computer system interface)), FCP (Fibre Channel Protocol), NFS (Network File System), SMB/CIFS (Server Message Block/Common Internet File System), hypertext transfer protocol (HTTP), transmission control protocol/internet protocol (TCP/IP), or another convenient protocol.

In the example of FIG. 1, the network storage controller 102 includes a storage operating system that includes a storage manager to logically organize data and to control storage access operations. The storage manager can implement a hierarchical structure of directories and files on one or more logical units. Data stored by the network storage controller 102 can be stored in basic units of data called blocks. Files can be defined from multiple blocks, as can larger units of storage, such as volumes.

In the example of FIG. 1, writeable PPI manager 104 controls access to writeable PPIs. The writeable PPI manager 104 includes a plurality of modules discussed in further depth in reference to FIG. 6. The writeable PPI manager 104 can be included in the network storage controller 102 or can be a separate unit coupled to the network storage controller 102. Further, in some cases, the writeable PPI manager 104 could be located on other computing devices. For example, the writeable PPI manager 104 could be located on one or all of the clients 112, a management station (not shown), or another convenient computing device.

In the example of FIG. 1, network 106 can be, for example, a local area network (LAN), wide area network (WAN), metropolitan area network (MAN), global area network such as the Internet, a Fibre Channel fabric, any combination of such networks, or any other known or convenient medium for communicating data. The network 106 can include one or more routers, switches and/or other networking hardware elements coupled together to provide communications to systems or within systems and devices coupled to the network 106.

In the example of FIG. 1, mass storage devices 110-1 through 110-*m* can be, for example, hard disk drives, such as magnetic hard disks, optical disks, or another form of storage for persistently storing large amounts of data.

In the example of FIG. 1, clients 112-1 through 112-*n* can be individual personal computers, server class computing devices, or any other convenient computing systems. The clients 112 can store and retrieve data using any of various network storage protocols, such as iSCSI, FCP, NFS, SMB/CIFS, HTTP, TCP/IP, or another convenient protocol.

In the example of FIG. 1, in operation, in response to a request from a client for a file system based on a writeable PPI, the writeable PPI manager 104 creates a writeable PPI within storage managed by the network storage controller 102. The network storage controller 102 receives the request and creates a writeable PPI (not shown). When doing so, the writeable PPI manager 104 captures the date and time of creation of the writeable PPI, for example by creating a file within the writeable PPI having the date and time of creation of the file as an attribute. Additionally, the writeable PPI manager 104 stores an identifier of the creator of the writeable PPI. Should an entity other than the client 112-1 attempt to delete the writeable PPI, the attempt will be denied, and the writeable PPI will not be deleted.

One of the clients 112, for example client 112-1, can create a file system for use of the writeable PPI to perform operations on the data stored therein. When the client 112-1 has completed use of the writeable PPI, the client 112-1 can delete the file system and instruct the network storage controller 102 to delete the writeable PPI.

Upon the request to delete the writeable PPI from the client 112-1, the writeable PPI manager 104 inspects the writeable PPI to determine whether or not the writeable PPI has reached an end of its life cycle. The various tests are discussed in depth in regard to FIG. 5. If the writeable PPI is determined to have reached the end of its life cycle, then the writeable PPI manager 104 deletes the writeable PPI. Alternatively, if the writeable PPI manager 104 determines that the writeable PPI has not reached the end of its life cycle then the writeable PPI is not deleted.

Figure 2:
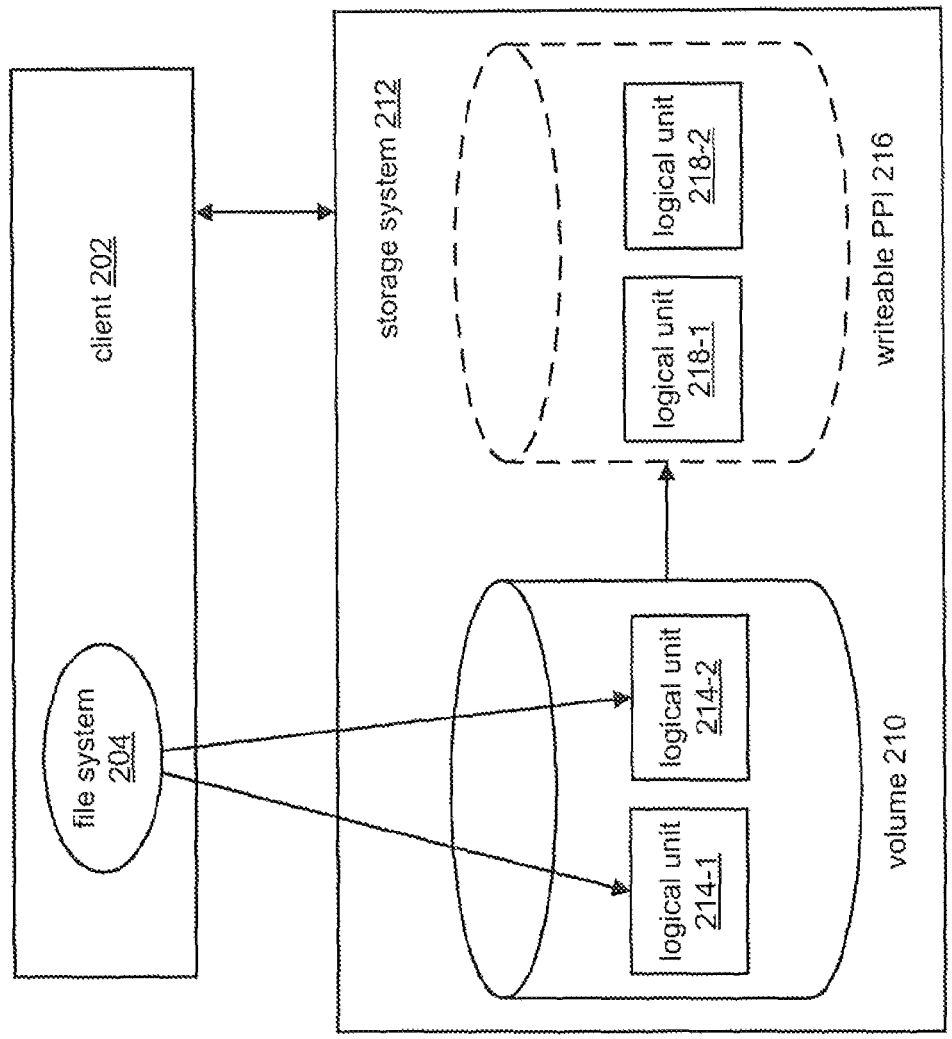
FIG. 2 is a diagram of a system including a writeable PPI created from a volume.

FIG. 2 is a diagram of a system 200 including a writeable PPI created from a volume. System 200 includes client 202 and storage system 212. Client 202 includes file system 204. Storage system 212 includes volume 210 and writeable PPI 216. Volume 210 includes logical units 214-1 and 214-2. Volume 210 could include additional logical units as well (not shown). Writeable PPI 216 includes logical units 218-1 and 218-2. Writeable PPI 216 can include additional logical units as well (not shown). In the example of FIG. 2, the client 202 and the storage system 212 can be a client 112 and a storage system 101 as discussed in reference to FIG. 1.

Client 202 can be any physical or virtual computing system. For example, the client 202 can be a stand alone computing system, or can be a part of a networked computing system. The client 202 has a need for networked storage, and can communicate over one or more network protocols to reach the network storage. For example, the client 202 can make use of the iSCSI protocol.

The file system 204 can manage "files" as well as blocks of data, logical containers of data, and/or other data units and organizational modules.

The volume 210 can be a division of an aggregate managed by the storage system 212. As used herein, an "aggregate" is a logical abstraction of a plurality of non-volatile mass storage devices. The volume 210 can include other logical units in addition to those depicted in FIG. 2.

The writeable PPI 216 is a persistent point-in-time image (PPI) of data in the volume 210. The writeable PPI 216 includes the data in the logical units 214 and thus includes the data managed by the file system 204 as it was at the time that the writeable PPI was taken.

The logical units 214 are divisions of the volume 210. The volumes can be of flexible size meaning the size of the volume can be changed as is needed subject to system storage constraints. For example, the volumes could be set to a size of 1 TB and then expanded to 1.5 TB when needed.

The logical units 218 are writeable logical units associated with the data of logical units 214 by virtue of being within the writeable PPI 216.

In operation, the client 202 requests the creation of the writeable PPI 216 within the storage system 212. In response to the request the storage system creates the writeable PPI 216 from the volume 210. A writeable PPI manager (not shown) prepares the writeable PPI 216 for use. The writeable PPI manager is further discussed in reference to FIG. 6.

With the writeable PPI created, the client 202 builds the file system 204 to define the logical units 214 for use as storage by the client 202. The client 202 transmits and receives data with the storage system 212 such as by using a conventional protocol that transfers the data over a network and stores the data within the logical units 214.

After completing the use of the writeable PPI 216 the client 202 requests deletion of the writeable PPI 216. In response to the request, the storage system 212 invokes a writeable PPI manager (not shown) as discussed in reference to FIG. 6 to analyze the writeable PPI 216. The writeable PPI manager can execute a process, such as is discussed in reference to FIG. 5, to inspect the writeable PPI to determine whether or not the writeable PPI has reached the end of its life cycle. If the writeable PPI is determined to have reached the end of its life cycle, then writeable PPI is deleted, otherwise the request is denied.

Figure 3:
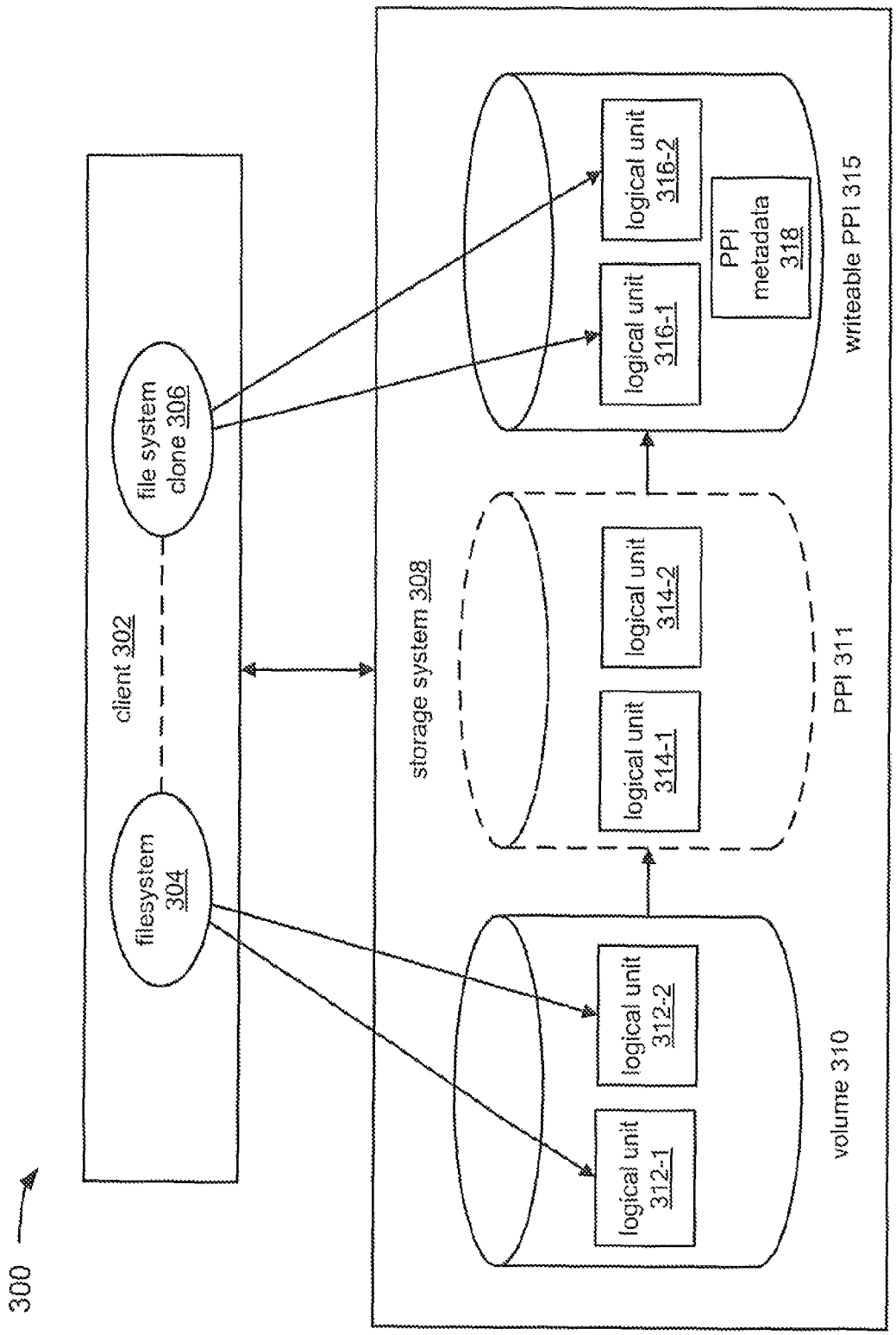
FIG. 3 is a diagram of a system including a writeable PPI created from a PPI.

FIG. 3 is a diagram of a system 300 including a writeable PPI created from a PPI. System 300 includes client 302, and storage system 308. Client 302 includes file system 304 and file system clone 306. Storage system 308 includes volume 310, PPI 311, and writeable PPI 315. Volume 310 includes logical unit 312-1 and logical unit 312-2 (collectively logical units 312). PPI 311 includes logical unit 314-1 and logical unit 314-2 (collectively logical units 314). Writeable PPI 310 includes logical unit 316-1, logical unit 316-2 (collectively logical units 316), and PPI metadata 318. The client 302, file system 304, storage system 308, volume 310, PPI 311, logical units 312, and logical units 314 can be as discussed in reference to FIG. 2.

File system clone 306 can be a file system created to manage the logical units 316 for the storage and retrieval of data for the client 302. The file system 306 can otherwise be a file system as discussed in reference to FIG. 2.

The writeable PPI 315 can be a readable writeable storage device including data from the volume 310 at the time that PPI 311 was taken. Storage within the PPIs can be subject to reservation settings. "Reservation settings" are size requirements setting the minimum amount of data that must be available to be allocated to the writeable PPI 315. Reservation setting can be established for the entire writeable PPI 315, or can be established for the individual logical units 316.

The logical units 316 store data included in the logical units 312 at the time that the PPI 311 was taken. The PPI metadata 318 includes a variety of information used by the writeable PPI. For example, the PPI metadata 318 can be encrypted, and can store encryption information, time of creation information, owner information, and other information useful for the maintenance of the writeable PPI. For example, the PPI metadata 318 can store the identifier of a creator of the writeable PPI. The identifier can be compared with the identity of a client or system attempting to delete the writeable PPI. Where the identifier does not match, that client or system can be denied permission to delete the writeable PPI.

In operation, the client 302 requests that the storage system 308 create the writeable PPI 315 from the PPI 311 for the file system clone 306. When writing data to the file system clone 306, the client 302 will write data to the writeable PPI 315.

The storage system 308 responds to the request by invoking a writeable PPI manager (not shown) to create the writeable PPI 315 from the PPI 311. The writeable PPI manager is discussed further in reference to FIG. 6. In creating the writeable PPI, the storage system 308 defines the PPI metadata 318 to capture information within the writeable PPI 315.

For example, a time of creation of the writeable PPI 315 can be captured in the writeable PPI 315. That point in time can separately identify the date and time of creation of the writeable PPI 315 from that of the underlying volume. Advantageously, the writeable PPI 315 can be identified as modified relative to the PPI 311 and the volume 310.

Additionally, for example, the writeable PPI can be marked with an identifier of the creator of the writeable PPI 315, for example an identity of a client, the identity of a specific computing system, the identity of a person, or another convenient classification of identity. This identifier can be checked so that an entity attempting to, e.g., change or delete the writeable PPI can be prevented from doing so, if prevention is desirable. Advantageously, the writeable PPI is protected from the negligent or malicious activity of entities that should not modify or delete the writeable PPI. An example of marking the writeable PPI 315 could be storing the identifier as metadata within the writeable PPI 315.

Once the client 302 has completed operations on the writeable PPI 315, client 302 requests the deletion of a file system using the writeable PPI 315. In response, the client 302 or the storage system 308 automatically invokes the writeable PPI manager (not shown) to inspect the writeable PPI 315 for deletion. A writeable PPI pre-deletion inspector 602 as discussed in reference to FIG. 6 can perform the inspection to determine whether or not the writeable PPI has reached the end of its life cycle. If the writeable PPI is determined to have reached the end of its life cycle, then writeable PPI is deleted otherwise the request is denied.

Figure 4:
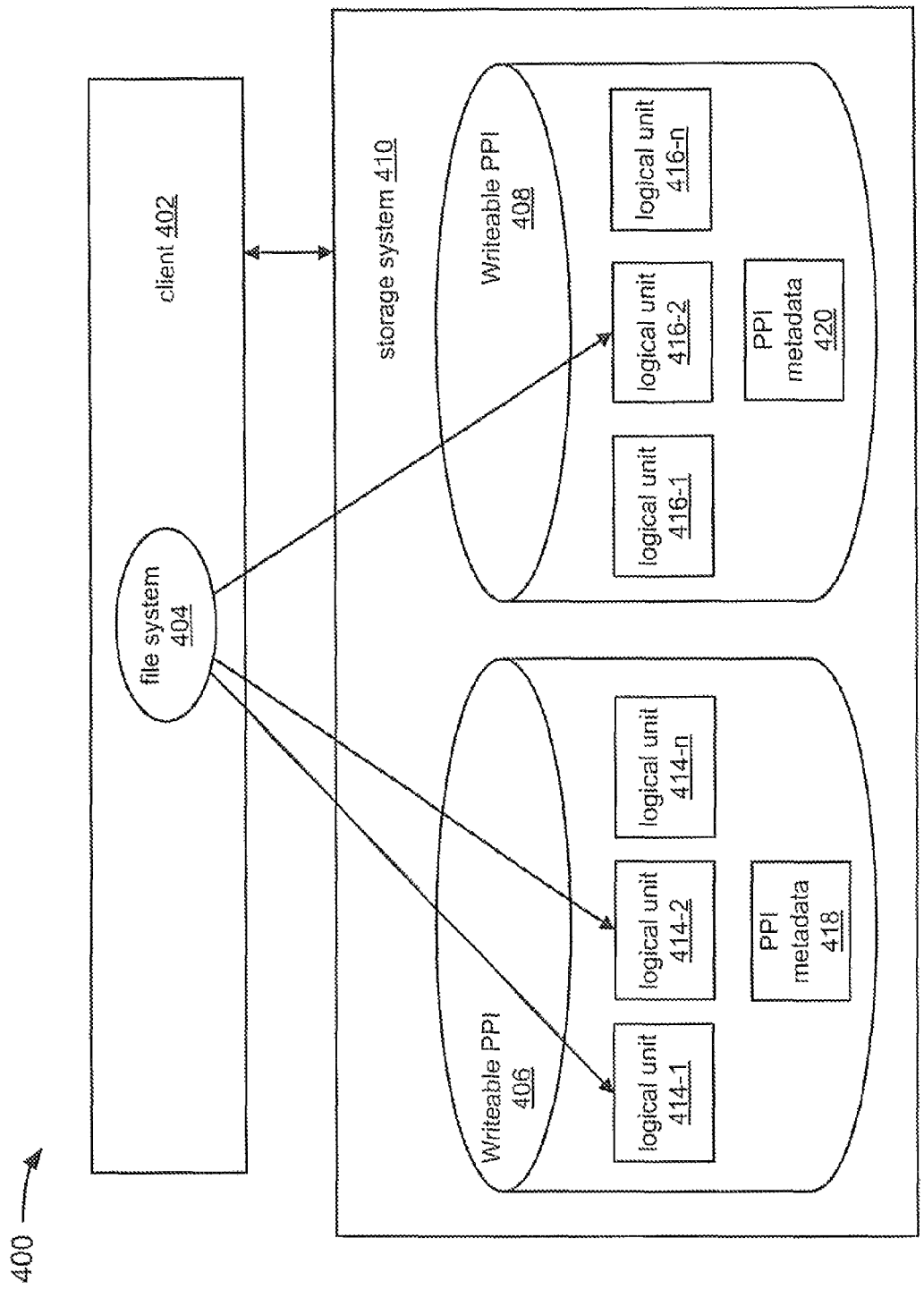
FIG. 4 is a diagram of a system including a file system created using multiple writeable PPIs.

FIG. 4 is a diagram of a system 400 including a file system created using multiple writeable PPIs. The example of FIG. 4 extends the concepts discussed in reference to FIG. 2 and FIG. 3 to file systems dependent on multiple PPIs. System 400 includes client 402 and storage system 410. The client 402 includes file system 404. The storage system includes writeable PPI 406 and writeable PPI 408. The writeable PPI 406 includes logical units 414-1 through 414-$n$ (collectively logical units 414), and PPI metadata 418. The writeable PPI 408 includes the logical units 416-1, through 416-$n$ (collectively logical units 416) and PPI metadata 420.

In the example of FIG. 4, the file system 404 is created to make use of logical units on more than one writeable PPI. The file system can do so by interpreting the logical units 414-1, 414-2, and 416-2 as a single readable writeable unit. Where a file system is created from logical units included in more than one volume, writeable PPIs for each of the volumes can be used to create the file system.

In the example of FIG. 4, in operation, the client 402 creates file system 404. File system 404 is based on more than one writeable PPI. In this case, the file system 404 is based on the writeable PPIs 406 and 408. For the purposes of this example, the writeable PPIs 406 and 408 were assumed to have been created in the same manner as discussed in reference to FIG. 2 and FIG. 3.

The file system 404 is created to manage the data in the logical units 414-1, 414-2, and 416-2. The client 402 uses the file system 404 to perform operations on the data in the logical units 414-1, 414-2, and 416-2. Within the storage system 410, the writeable PPIs then store and retrieve data to the logical units 414-1, 414-2, and 416-2 as is needed by the client 402.

Once the client 402 has completed the operations on the data, the client 402 requests the deletion of the file system 404. This results in the automatic inspection of writeable PPIs 406 and 408 for deletion. If the writeable PPIs are determined to have reached the end of their life cycles, then writeable PPIs are deleted otherwise the request is denied.

Figure 5:
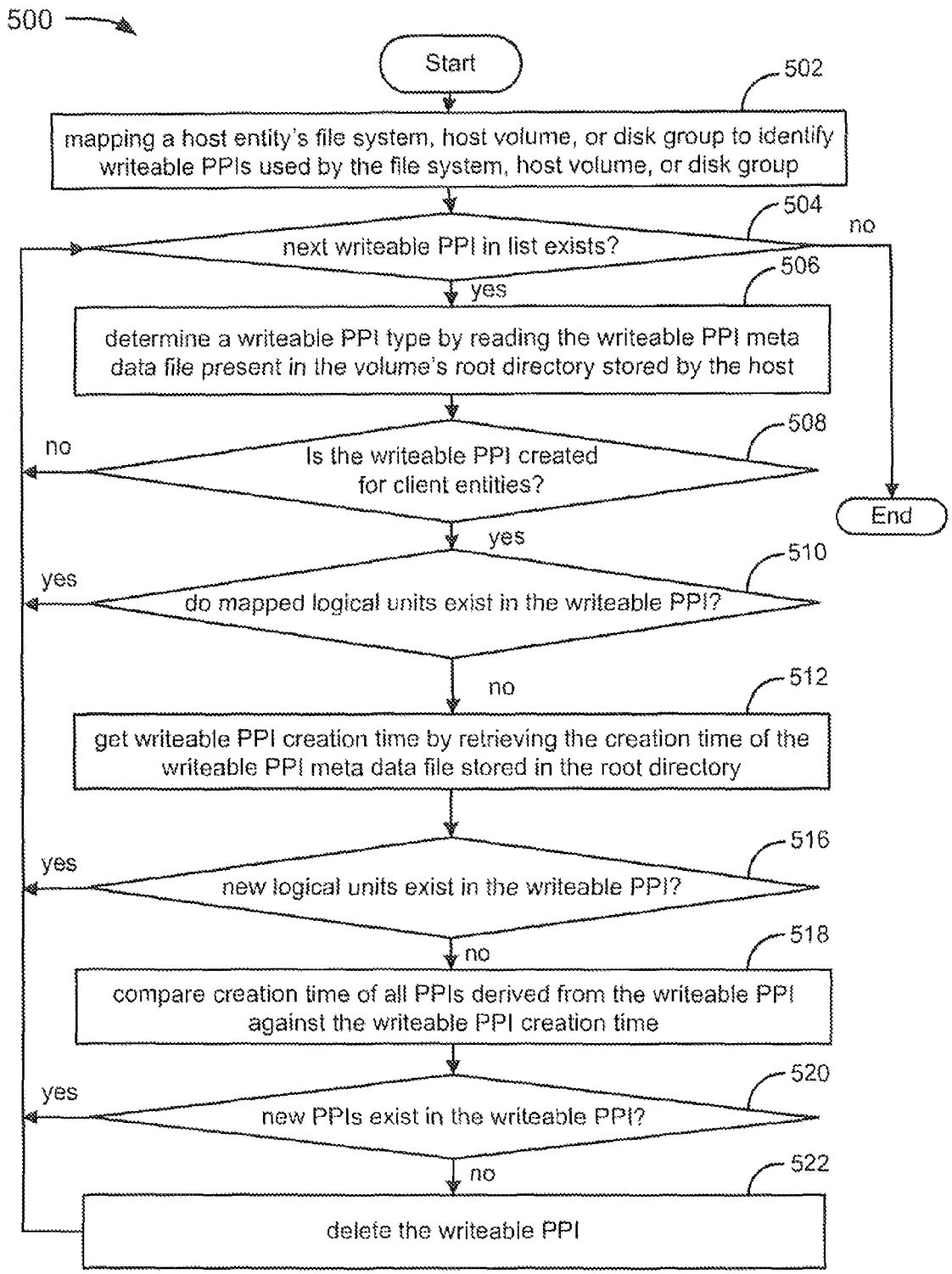
FIG. 5 is a flowchart of a process for analyzing a writeable PPI to determine whether or not the writeable PPI has reached the end of its life cycle.

FIG. 5 is a flowchart of a process 500 for analyzing a writeable PPI to determine whether or not the writeable PPI has reached the end of its life cycle. An automated routine or a user triggers the process by indicating that a network storage controller should delete a writeable PPI, such as when a client has decided to delete a file system that used one or more writeable PPIs. A writeable PPI pre-deletion inspector 602 can perform the actions in the process and can involve other modules of the writeable PPI manager 600 as discussed in reference to FIG. 6.

The process starts at module 502 with mapping a host entity's file system, host volume, or disk group to identify writeable PPIs used by the file system, host volume, or disk group. As discussed in reference to FIG. 2, a file system is created based on a number of logical units that underlie the file system. A host file system translation engine 604 as discussed in reference to FIG. 6 can perform the mapping.

The process continues to decision module 504 with deciding whether or not a next writeable PPI in the list exists. In the case that this is the first time that the module 504 has been executed, then the first logical unit in the list is identified as the next volume. A writeable PPI pre-deletion inspector 602 as discussed in reference to FIG. 6 can make the decision.

If the decision at module 504 is no, then the process terminates, as all writeable PPIs have been considered. Alternatively, if the decision at module 504 is yes, then the process proceeds to module 506 with determining a writeable PPI type by reading a writeable PPI metadata file present in the volume's root directory stored by the host. As discussed in reference to FIG. 3, the PPI metadata can include information describing the types of logical units used by the writeable PPI. A writeable PPI pre-deletion inspector 602 as discussed in reference to FIG. 6 can make the decision.

The process proceeds to module 506 with determining a writeable PPI type by reading the writeable PPI metadata file present in the volume's root directory stored by the host. The volume type information can be stored in the PPI metadata file for later retrieval. A writeable PPI pre-deletion inspector 602 as discussed in reference to FIG. 6 can analyze the writeable PPI metadata.

The process then proceeds to decision module 508 with deciding whether or not the writeable PPI is created for client entities. A writeable PPI can be designated for use by clients, or alternatively it can be used for other purposes, such as purposes internal to the storage system. The designation can be included in a metadata file within the writeable PPI. A writeable PPI pre-deletion inspector 602 as discussed in reference to FIG. 6 can read the metadata to make the decision. If the designation within the writeable PPI metadata does not indicate that the writeable PPI is created for client entities then the writeable PPI should not be deleted as the writeable PPI could be used by the storage server for other purposes, and deletion could impact the other purposes.

If the decision at decision module 508 is no, then the process loops to decision module 504. Alternatively, if the decision at decision module 508 is yes, then the process proceeds to decision module 510 with deciding whether mapped logical units exist in the writeable PPI. A writeable PPI pre-deletion inspector 602 as discussed in reference to FIG. 6 can make the decision. If clients are presently mapped to logical within the writeable PPI, then clients may be using the writeable PPI, and deletion of the writeable PPI should be prevented to avoid interrupting the clients or damaging data.

If the decision at decision module 510 is no, then the process loops to decision module 504 as the writeable PPI may be in use. Alternatively, if the decision at decision module 510 is no, then the process proceeds to module 512 with getting a writeable PPI creation time by retrieving the creation time of the writeable PPI metadata file stored in, e.g., the root directory of the writeable PPI. The writeable PPI creation time can be stored in the PPI metadata file at the time of creation of the writeable PPI, as described above. For example, the time of creation could be copied from a file created at the time of creation of the writeable PPI. A writeable PPI pre-deletion inspector 602 as discussed in reference to FIG. 6 can analyze the writeable PPI creation time.

The process proceeds to decision module 516 with deciding whether new logical units exist in the writeable PPI or not. "New" in this context is used to mean that the logical units have been created after the time of creation of the writeable PPI. A writeable PPI pre-deletion inspector 602 as discussed in reference to FIG. 6 can make the decision. Logical units can be created subsequent to the creation of the writeable PPI for use by other clients. If this is the case then the writeable PPI should not be deleted, as clients may be using the subsequently created logical units, even if such clients have temporarily disconnected from the logical units and are not currently mapped to the logical units.

If the decision at module 516 is yes, then the process loops to module 504. Alternatively, if the decision at module 516 is no, then the process proceeds to module 518 with comparing the creation time of all PPIs derived from the writeable PPI against the writeable PPI creation time. A PPI can be created from another PPI. The PPIs "derived" from the writeable PPI include such PPIs. Deletion of the PPI can interrupt the use of the PPIs derived from the PPI. Any newer PPIs can be identified by their later creation time. If there are any PPIs derived from the PPI then deletion should be avoided to preclude the interruption of a client. A writeable PPI pre-deletion inspector 602 as discussed in reference to FIG. 6 can make the comparison.

The process proceeds to decision module 520 with deciding whether new PPIs exist in the writeable PPI or not. A writeable PPI pre-deletion inspector 602 as discussed in reference to FIG. 6 can make the decision. If the decision at module 520 is yes, then the process loops to module 504. The existence of PPIs created after the time of creation of the writeable PPI can indicate that clients are using the volume. Therefore, such a writeable PPI should not be deleted. Alternatively, if the decision at module 520 is no, then the process proceeds to module 522 with deleting the writeable PPI.

In the example of FIG. 5, the process loops to module 504. Having deleted the writeable PPI, the next volume can be considered.

Figure 6:
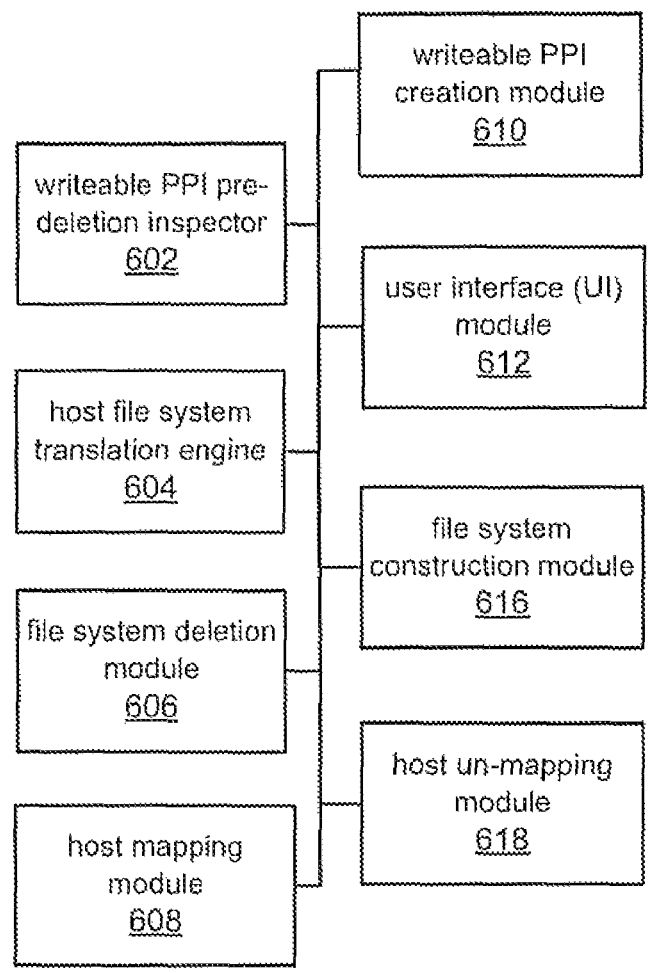
FIG. 6 is a high-level block diagram showing modules of a writeable PPI manager.

FIG. 6 is a high-level block diagram showing modules of a writeable PPI manager 600. Writeable PPI manager 600 includes writeable PPI pre-deletion inspector 602, host file system translation engine 604, file system deletion module 606, host mapping module 608, writeable PPI creation module 610, command line interface module 612, command line interface module 612, file system construction module 616 and host un-mapping module 618. The modules disclosed herein can be implemented as software modules, specially purposed hardware, firmware or a combination thereof.

The writeable PPI pre-deletion inspector 602 can execute a process as discussed in reference to FIG. 5 to determine whether or not one or more writeable PPIs have reached the end of their life cycles. If the writeable PPIs have reached the ends of their life cycles, then the writeable PPI pre-deletion inspector 602 can determine that the writeable PPIs are ready for deletion.

The host file system translation engine 604 can map a file system to one or more logical units of one or more writeable PPIs underlying the file system.

The file system deletion module 606 can free up resources no longer needed from a previously used file system. For example, once a client has completed a project with a file system and no longer needs the file system, the resources used by the file system can be reclaimed for other use.

The host mapping module 608 can associate a client, such as a client 112 discussed in reference to FIG. 1, with a file system created on a storage system, such as a storage system 101 discussed in reference to FIG. 1.

The writeable PPI creation module 610 is operable to duplicate a writeable PPI, such as by creating a copy of an underlying PPI. The newly created writeable PPI can be used in the place of the original writeable PPI, if needed.

The user interface (UI) module 612 can receive instructions for the writeable PPI manager through from a user or process. For example, if a user or client would like the writeable PPI manager to create a writeable PPI having certain characteristics the user or process could enter such requirements via the UI module 612 in instructing the writeable PPI manager.

The file system construction module 616 maps a client to one or more logical units in one or more writeable PPIs for use by a client as a single, virtual data storage device. For example, two logical units from different writeable PPIs could be used together to create a file system for read/write access by a client. This is as depicted in FIG. 3 with respect to the file system clone 306. Also, the mapping can be as is shown in FIG. 4 with respect to file system 404. As such, multiple logical units from multiple volumes and/or the same or different writeable PPIs could be mapped.

The host un-mapping module 618 is operable to terminate a connection between a client and a storage system. For example, upon completion of a task where the connection is no longer needed, the client can be unmapped from the storage system.

Figure 7:
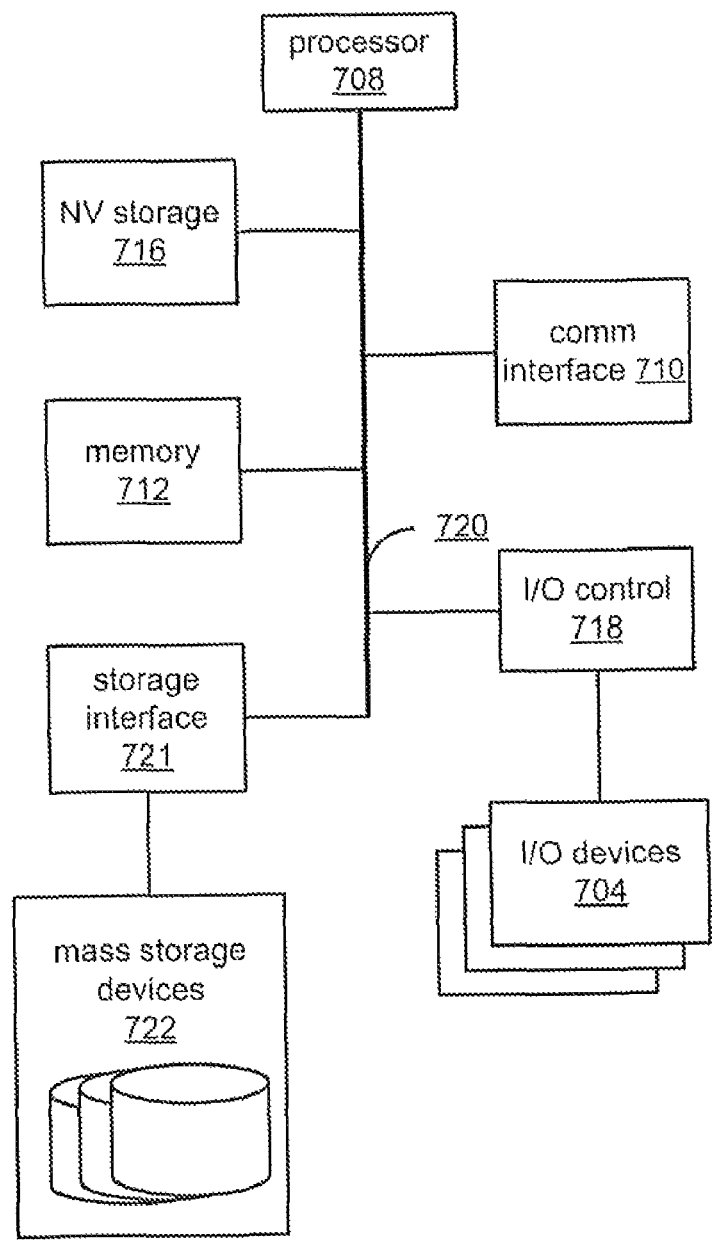
FIG. 7 is a high-level block diagram showing an example of the architecture of a processing system that can be representative of any of the processing systems discussed herein, such as a host or network storage controller.

FIG. 7 is a high-level block diagram showing an example of the architecture of a processing system 700 that can be representative of any of the processing systems discussed herein, such as a host or network storage controller, which may include system 600 as shown in FIG. 6. The system 700 may be a conventional computing system that can be used as a client computing system, such as a personal computing system, hand held device, workstation, or server-class computing system. The system 700 includes I/O devices 704, processor 708, storage interface 721, a communications interface 710, memory 712, non-volatile storage 716, I/O controller 718.

The communications interface 710 may include a modem or network interface. The communications interface 710 can be an ethernet adapter, a Fibre Channel (FC) adapter, an analog modem, ISDN modem or terminal adapter, cable modem, token ring IEEE 802.5 interface, Ethernet/IEEE 802.3 interface, wireless 802.11 interface, satellite transmission interface (e.g. "direct PC"), WiMAX/IEEE 802.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or other interfaces for coupling a computer system to other computer systems.

The processor 708 may be, for example, a conventional programmable microprocessor such as an Intel Pentium microprocessor or Motorola power PC microprocessor. The memory 712 is coupled to the processor 708 by a bus 720. The memory 712 can be Dynamic Random Access Memory (DRAM) and can also include Static RAM (SRAM). The bus 720 couples the processor 708 to the communications interface 710, to the memory 712, also to the non-volatile (NV) storage 716, to the I/O controller 718, and to the mass storage interface 721.

The I/O devices 704 can include a keyboard, disk drives, printers, a scanner, and other input and output devices, including a mouse or other pointing device.

The non-volatile storage 716 can be or include a magnetic hard disk, flash memory, an optical disk, or another form of persistent storage for large amounts of data. Some of this data is often written, by a direct memory access process, into memory 712 during execution of software. One of skill in the art will immediately recognize that the terms "machine-readable medium" or "computer-readable medium" includes any type of information storage device that is accessible by the processor 708. Software or firmware embodying the system 600 can be stored in, e.g., NV 716 or memory 712.

The storage interface 721 includes input/output (I/O) interface circuitry that couples the storage interface 721 to mass storage devices disks over an I/O interconnect arrangement, such as a conventional high-performance, FC (Fibre Channel) serial link topology. Information may be stored on any type of attached array of writable storage device media such as video tape, optical, DVD, magnetic tape, bubble memory, electronic random access memory, micro-electro mechanical and any other similar media adapted to store information, including data and parity information. The mass storage devices 722 are often magnetic hard disks, optical disks, or another form of storage for large amounts of data.

The system 700 is one example of many possible computing systems which have different architectures. For example, personal computers (PCs) based on an Intel microprocessor often have multiple buses, one of which can be an I/O bus for the peripherals and one that directly connects the processor 708 and the memory 712 (often referred to as a memory bus). The buses are connected together through bridge components that perform any necessary translation due to differing bus protocols.

Network computing devices are another type of computing system that can be used in conjunction with the teachings provided herein. Network computing devices do not usually include a hard disk or other mass storage, and the executable programs are loaded from a network connection into the memory 712 for execution by the processor 708. A typical computing system will usually include at least a processor, memory, and a bus coupling the memory to the processor.

Software or firmware embodying the techniques introduced above can be stored in memory 712, NV storage 716, and/or mass storage devices 722. The software and firmware can also be included on one or more external systems coupled to the processing system 700 by the communication interface 710, and/or an I/I device included in the I/O devices 704.

In addition, the system 700 is controlled by operating system software which includes a writeable PPI manager, such as a part of the operating system software (these components are not shown in FIG. 7). One example of operating system software with its associated writeable PPI manager is the family of operating systems known as Data OnTap® from NetApp, Inc. of Sunnyvale, Calif., with its associated WAFL (write anywhere file layout) file system. The writeable PPI manager is typically stored in the non-volatile storage 716 and causes the processor 708 to execute the various acts required by the operating system to input and output data and to store data in memory, including inspecting the writeable PPIs on the non-volatile storage 716 to determine whether or not the writeable PPIs are ready for deletion.

The techniques discussed above allow for the inspection and deletion of a writeable PPI that has reached the end of its life cycle. Accordingly, a writeable PPI manager can determine whether or not a writeable PPI has failed to meet the requirements for deletion. The writeable PPI manager can determine which writeable PPIs to delete by testing the writeable PPIs for a variety of conditions.

What is claimed is:
1. A method comprising:
   creating a metadata file in a writeable persistent point-in-time image (PPI) at a time of creation of the writeable PPI, the metadata file including a time and date of creation of the writeable PPI independent from a time and date of creation of an underlying PPI on which the write- able PPI is based, the writeable PPI including at least one logical unit at the time of creation; and in response to a deletion of a file system using the writeable PPI, inspecting the writeable PPI to determine whether the writeable PPI has reached an end of a life cycle, including testing the writeable PPI to determine:

whether a logical unit included in the writeable PPI has a creation time later than the time of creation of the metadata file, the presence of a creation time of a logical unit after the creation time of the metadata file indicating that an additional logical unit has been created after the creation of the writeable PPI;

whether a client is presently mapped to a logical unit within the writeable PPI;

whether a client or other entity is the creator of the writeable PPI; wherein an identifier of the creator of the writeable PPI is retrieved from the metadata file and compared with an identifier of a client or other entity attempting to delete the writeable PPI; and whether an additional writeable PPI was created from the writeable PPI.

2. The method of claim 1 wherein the metadata file is encrypted.

3. The method of claim 1, further comprising:
deleting the writeable PPI only after said inspecting the writeable PPI results in a determination that the writeable PPI has reached the end of the life cycle.

4. The method of claim 3, further comprising:
preventing deletion of the writeable PPI in response to deletion of the file system if said inspecting the writeable PPI results in a determination that the writeable PPI has not reached the end of the life cycle.

5. A system comprising:
a processor; and
a non-transitory storage medium coupled to the processor and storing code which, when executed by the processor, causes the system to execute operations including:

creating a metadata file in a writeable persistent point-in-time image (PPI) at a time of creation of the writeable PPI, the metadata file including a time and date of creation of the writeable PPI independent from a time and date of creation of an underlying PPI on which the writeable PPI is based, the writeable PPI including at least one logical unit at the time of creation; and in response to a deletion of a file system using the writeable PPI, inspecting the writeable PPI to determine whether the writeable PPI has reached an end of a life cycle, including testing the writeable PPI to determine:

whether a logical unit included in the writeable PPI has a creation time later than the time of creation of the metadata file, the presence of a creation time of a logical unit after the creation time of the metadata file indicating that an additional logical unit has been created after the creation of the writeable PPI;

whether a client is presently mapped to a logical unit within the writeable PPI;

whether a client or other entity is the creator of the writeable PPI; wherein an identifier of the creator of the writeable PPI is retrieved from the metadata file and compared with an identifier of a client or other entity attempting to delete the writeable PPI; and whether an additional writeable PPI was created from the writeable PPI.

6. The system of claim 5, wherein the metadata file is encrypted.

7. The system of claim 5, wherein said operations further comprise:
deleting the writeable PPI only after said inspecting the writeable PPI results in a determination that the writeable PPI has reached the end of the life cycle.

8. The system of claim 5, wherein said operations further comprise:
preventing deletion of the writeable PPI in response to deletion of the file system if said inspecting the writeable PPI results in a determination that the writeable PPI has not reached the end of the life cycle.

9. A network storage controller comprising:
a processor;
a communications interface coupled to the processor, through which to communicate with a network storage client over a network;
a storage interface coupled to the processor, through which to communicate with a set of mass storage devices; and
a writeable persistent point-in-time image (PPI) manager configured to perform operations including:

creating a metadata file in a writeable PPI at a time of creation of the writeable PPI, the metadata file including a time and date of creation of the writeable PPI independent from a time and date of creation of an underlying PPI on which the writeable PPI is based, the writeable PPI including at least one logical unit at the time of creation; and in response to a deletion of a file system using the writeable PPI, inspecting the writeable PPI to determine whether the writeable PPI has reached an end of a life cycle, including testing the writeable PPI to determine:

whether a logical unit included in the writeable PPI has a creation time later than the time of creation of the metadata file, the presence of a creation time of a logical unit after the creation time of the metadata file indicating that an additional logical unit has been created after the creation of the writeable PPI;

whether a client is presently mapped to a logical unit within the writeable PPI;

whether a client or other entity is the creator of the writeable PPI; wherein an identifier of the creator of the writeable PPI is retrieved from the metadata file and compared with an identifier of a client or other entity attempting to delete the writeable PPI; and whether an additional writeable PPI was created from the writeable PPI.

10. The network storage controller of claim 9, wherein the metadata file is encrypted.

11. The network storage controller of claim 9, wherein said operations further comprise:
deleting the writeable PPI only after said inspecting the writeable PPI results in a determination that the writeable PPI has reached the end of the life cycle.

12. The network storage controller of claim 11, wherein said operations further comprise:
preventing deletion of the writeable PPI in response to deletion of the file system if said inspecting the writeable PPI results in a determination that the writeable PPI has not reached the end of the life cycle.

* * * * *